United States Patent Office 2,780,323
Patented Feb. 5, 1957

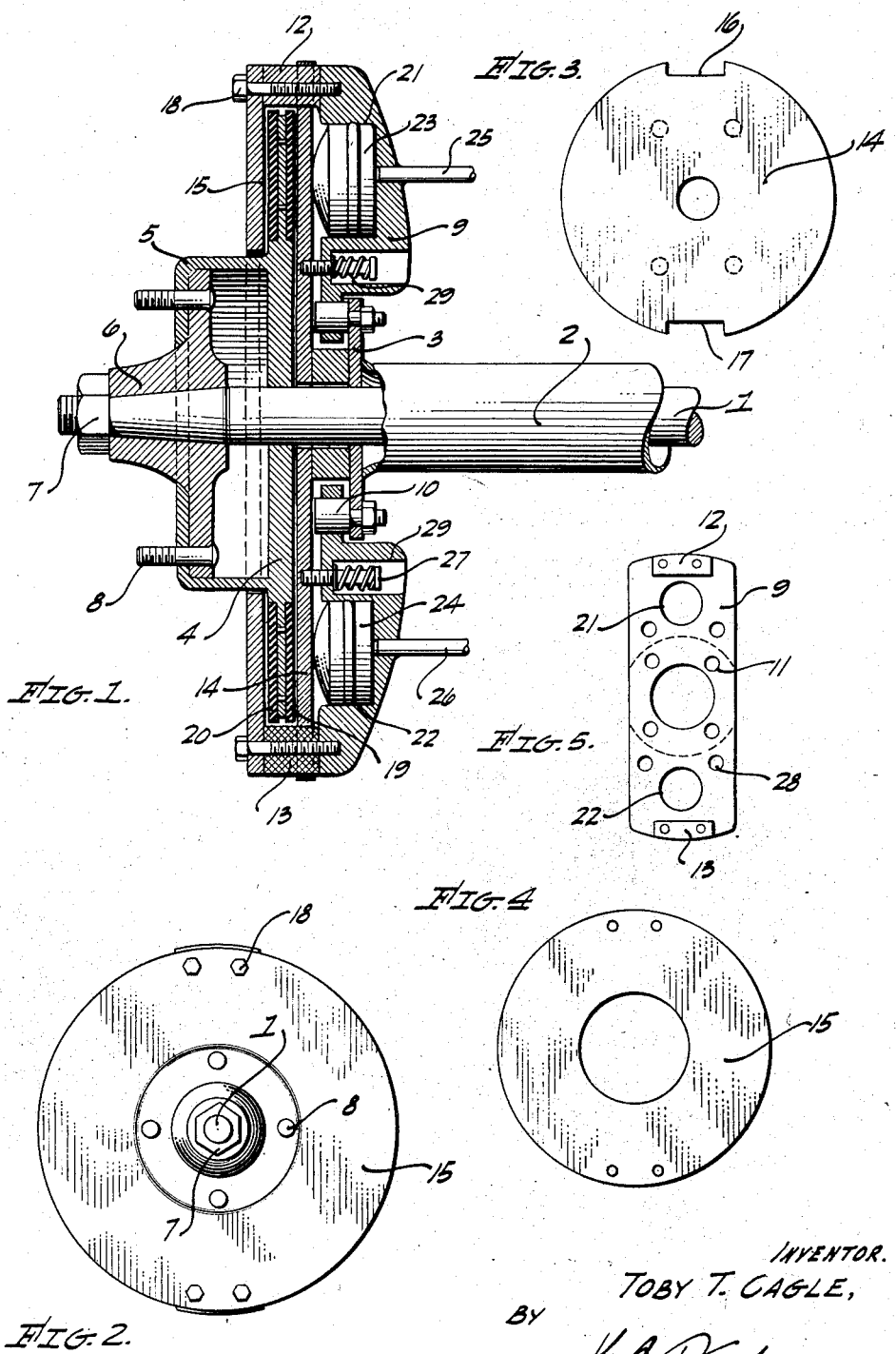

2,780,323

VEHICLE BRAKE CONSTRUCTION

Toby T. Cagle, Long Beach, Calif.

Application October 18, 1952, Serial No. 315,512

3 Claims. (Cl. 188—152)

This invention relates to a vehicle brake construction, particularly for automobiles and trucks, and consists of a novel combination of a rotating plate or ring with brake lining thereon and the means to force two stationary plates, one against each side of the rotating plate, whereby a large braking surface is provided.

An object of my invention is to provide a novel vehicle brake construction which consists of a minimum number of parts and which can be quickly and easily assembled on or removed from the vehicle.

Another object of my invention is to provide a novel vehicle brake construction in which the stationary plates or discs are pressed against the rotating disc by means of one or more hydraulic pistons engaging one of the stationary discs.

A feature of my invention is to provide a novel vehicle brake construction which can be mounted on the present vehicles without materially changing either the front or rear axle constructions, as presently employed in automobiles and trucks.

Other objects, advantages and features of invention may appear from the accompanying drawing, the subjoined detailed description and the appended claims.

In the drawing:

Figure 1 is a transverse sectional view of my novel vehicle brake construction.

Figure 2 is an end view of the same.

Figure 3 is a side elevation of one of the stationary discs.

Figure 4 is a side elevation of another of the stationary discs.

Figure 5 is a side elevation of the stationary body of the brake.

Referring more particularly to the drawing, I have here shown my brake construction as applied to the rear axle of a vehicle. However, the same construction is used on the front wheels and on the front axle of a vehicle.

The numeral 1 indicates the axle (which in this instance is the rear or driving axle) a housing 2 surrounds the axle 1 and a flange 3 is fixedly mounted on the outer end of the housing 2 or may be an integral part of this housing, all of which is usual and well known construction in this art. In the case of the front axle there is also a flange similar to 3 provided and, therefore, the brake assembly is mounted in the same manner. A rotating disc 4 is mounted on the axle 1 in a suitable manner, for example, the disc 4 may be provided with an integral cup 5 which is fixedly attached to or an integral part of the axle fitting 6 which rotates with the axle 1, since it is keyed to this axle and is also held in position by the nut 7.

The usual wheel studs 8 are mounted in the fitting 6 and protrude through the cup 5, substantially as shown, and the vehicle wheel is mounted on the studs 8 in the manner usual and well known in the art. The wheel and the bolts which thread on to the studs 8 are not shown, since this is so well known in the art.

A body 9 is mounted on the housing 2 in the following manner: A plurality of studs 10 (in this instance four) are mounted on the flange 3, or these studs may be an integral part of the flange, if desired. The body 9 is formed with suitable holes 11 which receive the studs 10. The body 9 can shift horizontally on the studs 10 to a slight extent, and this shifting movement is of importance, as will be subsequently described.

The body 9 is formed with oppositely arranged lugs 12—13, that is, the lugs are 180° apart. The purpose of these lugs is to mount the two brake discs 14 and 15 in the following manner: The disc 14 is formed with notches 16 and 17 therein, and these notches fit the lugs 12 and 13 respectively, thus nonrotatably holding the disc 14 and still permitting this disc to move horizontally relative to the body 9. The outer stationary disc 15 is bolted to the outer face of the body 9 by means of cap screws 18, thus the nonrotatable discs 14 and 15 are mounted on the body 9, and with the disc 14 on one side of the rotating disc 4 and the disc 15 on the other side of the rotating disc 4. The rotating disc 4 is also provided with two rings formed of brake linings 19 and 20, these brake linings being arranged so that the disc 14 can engage the lining 19, while the disc 15 can engage the lining 20.

The body 9 is formed with two or more cylinders 21 and 22 in which the pistons 23 and 24 are mounted. The pistons 23 and 24 both engage the nonrotatable disc 14 and when the pistons 24 are actuated hydraulically or pneumatically the disc 14 will be pressed against the brake lining 19 of the rotating disc 4. Hydraulic conduits 25 and 26 extend into the cylinders 21 and 22, respectively. It will be evident that when the pistons 23 and 24 move outwardly (that is, to the left as viewed in Figure 1) that there will be an opposite reaction on the body 9 to press that body towards the right as viewed in Figure 1. The body 9 can move horizontally because of its slidable mount on the studs 10. This movement of the body 9 towards the right will, therefore, press the stationary disc 15 against the brake lining 20, and thus the rotating disc 4 will be pinched between two discs 14 and 15 by the hydraulically actuated pistons 23 and 24.

To return the disc 14 from its position of engagement with the brake lining 19, I provide a plurality of studs 27 which extend through a counterbore 28 in the body 9 and screw into the disc 14. A spring 29 surrounds each of the studs 27 and bears against the head of the stud, thus tending to pull the disc 14 away from the rotating disc 4.

In operation the body 9 with the disc 14 mounted thereon is first mounted on the studs 10. The rotating disc 4 is next assembled on the axle 1. The second stationary disc 15 is now assembled on the body 9 by means of the cap screws 18. The brake is now assembled and ready to receive the wheel on the wheel studs or lugs 8. When hydraulic pressure is applied through the conduits 25 and 26 the discs 14 and 15 will be pressed against the brake linings 19 and 20, thus effectively clamping the rotating disc 4 between the stationary disc and nonrotatable disc. The brake linings 19 and 20, being annular, provide a large braking surface to more effectively stop the vehicle.

Having described my invention, I claim:

1. A vehicle brake construction comprising the combination of a vehicle axle and a stationary mounting means on the axle, of a body, means mounting said body on the mounting means, a rotatable disc mounted on said axle, a cup projecting from the rotatable disc and wheel studs projecting from the cup, a nonrotatable disc, means mounting the nonrotatable disc on said body for horizontal movement relative to the body, a second stationary disc, means fixedly attaching the second stationary disc to said body, said stationary disc and nonrotatable disc being positioned one on each side of the rotatable disc, said body having a cylinder therein, a piston in said cylinder, said piston bearing against the first named nonrotatable disc, and a hydraulic conduit extending into the cylinder.

2. A vehicle brake construction comprising the combination of a vehicle axle and a stationary mounting means on the axle, of a body, means mounting said body on the mounting means, a rotatable disc mounted on said axle, a cup projecting from the rotatable disc and wheel studs projecting from the cup, a nonrotatable disc, lugs on said body, said nonrotatable disc having notches therein to fit said lugs whereby the nonrotatable disc may move horizontally relative to the body, a second stationary disc spaced from the first named nonrotatable disc, bolts extending through the second stationary disc and into the body to fixedly attach the second stationary disc to said body, said stationary disc and nonrotatable disc being positioned one on each side of the rotatable disc, said body having a pair of cylinders therein, a piston in each cylinder, said pistons bearing against the first named nonrotatable disc, and a hydraulic conduit extending into the cylinder.

3. A vehicle brake construction comprising the combination of a vehicle axle and a stationary mounting means on the axle, of a body, means mounting said body on the mounting means, a rotatable disc mounted on said axle, a cup projecting from the rotatable disc and wheel studs projecting from the cup, a nonrotatable disc, lugs on said body, said nonrotatable disc having notches therein to fit said lugs whereby the nonrotatable disc may move horizontally relative to the body, a second stationary disc spaced from the first named nonrotatable disc, bolts extending through the second stationary disc and into the body to fixedly attach the second stationary disc to said body, said stationary disc and nonrotatable disc being positioned one on each side of the rotatable disc, said body having a pair of cylinders therein, a piston in each cylinder, said pistons bearing against the first named nonrotatable disc, and a hydraulic conduit extending into the cylinder, said body having a bore therein, a bolt extending through said bore and into the first named nonrotatable disc, a spring bearing against the body and the bolt to press the nonrotatable disc towards the body.

References Cited in the file of this patent

UNITED STATES PATENTS

| | | |
|---|---|---|
| 1,740,993 | McDonnell | Dec. 24, 1929 |
| 2,064,595 | Dodge | Dec. 15, 1936 |
| 2,260,189 | Morrison | Oct. 21, 1941 |
| 2,368,417 | Lambert | Jan. 30, 1945 |
| 2,485,086 | Cagle | Oct. 18, 1949 |
| 2,548,008 | Franklin | Apr. 10, 1951 |
| 2,611,453 | Vaughn | Sept. 23, 1952 |
| 2,657,772 | Chamberlain | Nov. 3, 1953 |
| 2,667,947 | Lucien | Feb. 2, 1954 |
| 2,711,802 | Davis | June 28, 1955 |